March 20, 1951  T. W. CLINE  2,545,766
BULK GRANULAR MATERIAL TRANSPORTING VEHICLE
Filed Sept. 2, 1948  2 Sheets-Sheet 1
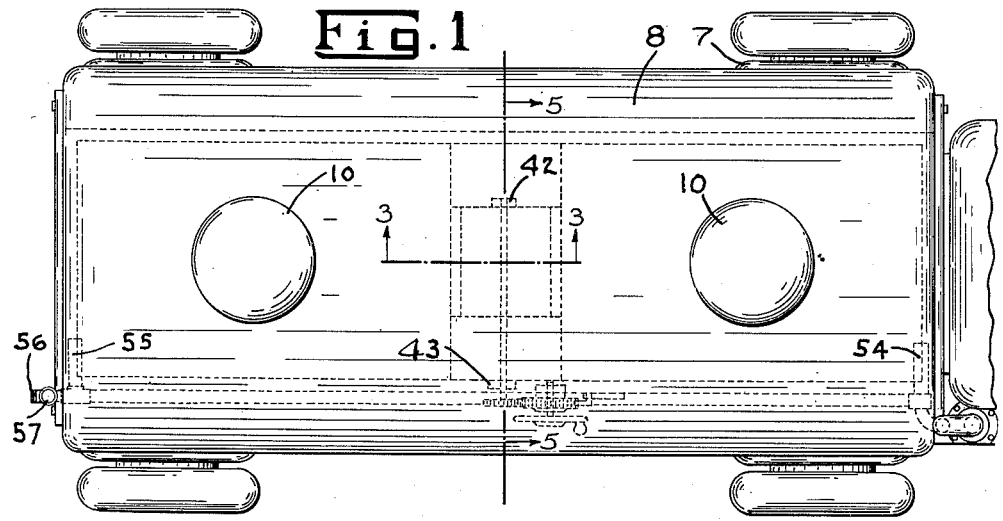
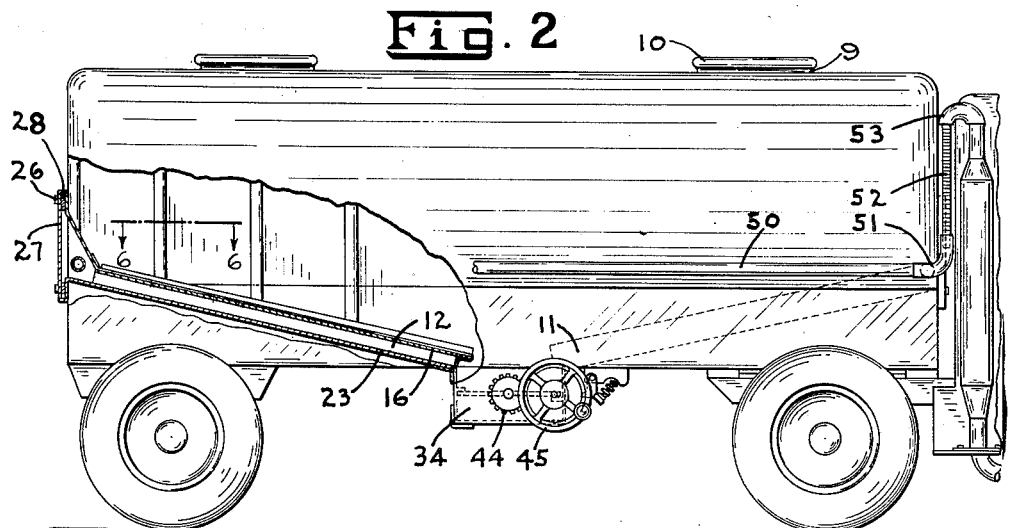
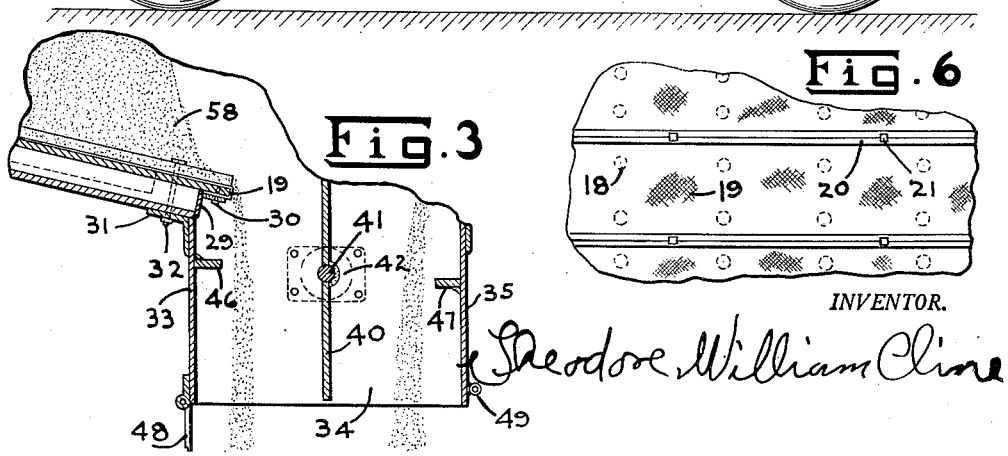
INVENTOR.
Theodore William Cline March 20, 1951 T. W. CLINE 2,545,766
BULK GRANULAR MATERIAL TRANSPORTING VEHICLE
Filed Sept. 2, 1948 2 Sheets-Sheet 2
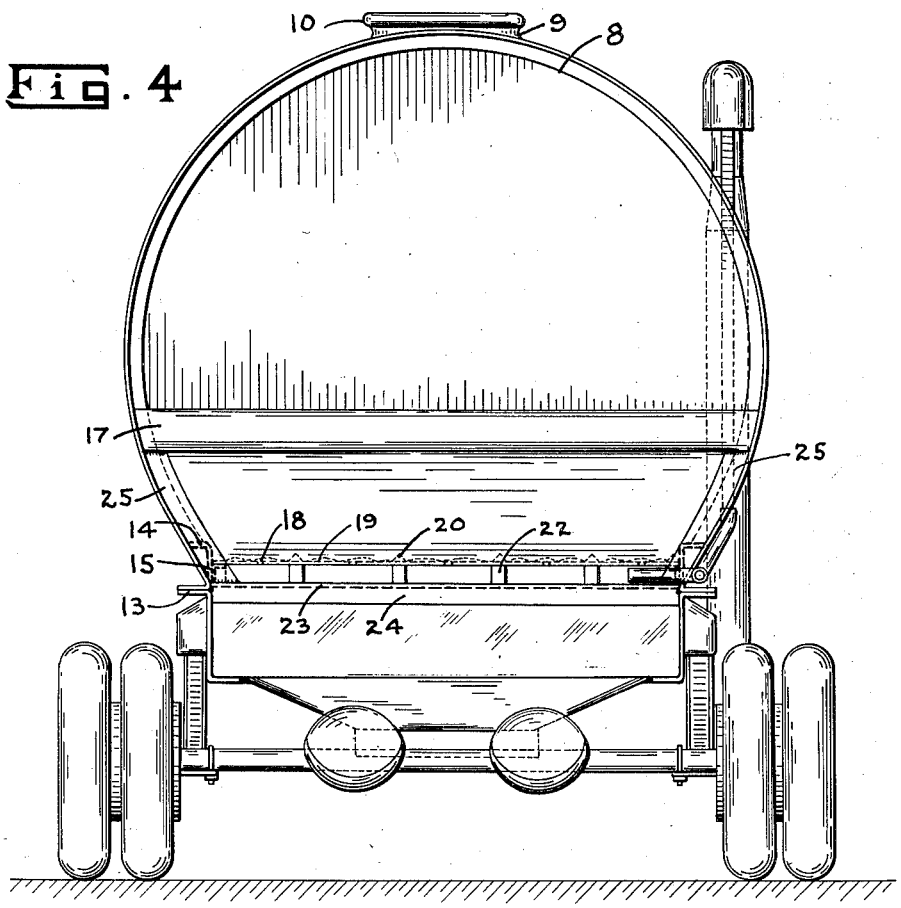
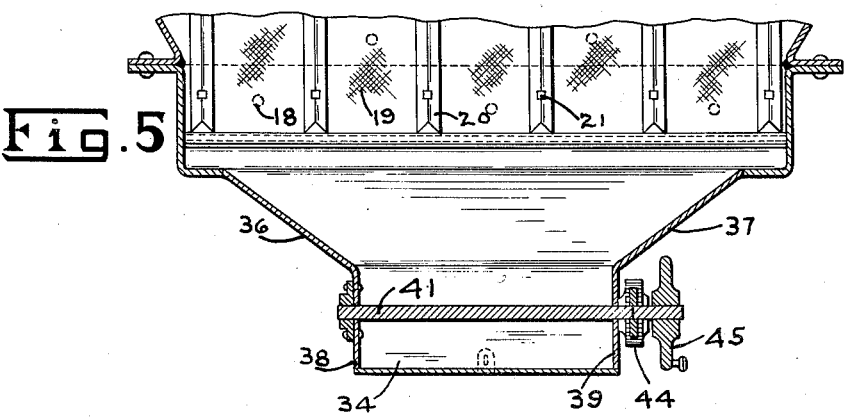
INVENTOR.
Theodore William Cline Patented Mar. 20, 1951

2,545,766

UNITED STATES PATENT OFFICE 2,545,766

BULK GRANULAR MATERIAL TRANSPORTING VEHICLE

Theodore William Cline, Bakersfield, Calif.

Application September 2, 1948, Serial No. 47,517

1 Claim. (Cl. 214—83.28)

My invention relates in general to vehicles such as trucks, four-wheel trailers, and tractor trailer combinations that are used for the transportion of bulk granular materials or more particularly, bulk cement. My general purpose is the provision of a vehicle with an inbuilt unloading mechanism in which the cement is discharged through the combined influence of an angularly inclined plane of moving air currents and the force of gravity. In obtaining this purpose the air currents are applied to the toe of a bank of cement, resting at its angle of repose, to loosen and blow away a small amount of cement producing a cavity which undermines the cement bank causing an additional portion of the overhanging cement to fall down and be caught by the air currents and blown away. These actions follow each other in a repeated sequence producing a cycle of material movement eventuating in complete discharge of the vehicle's load.

An important object of my invention is to provide a bulk cement transporting vehicle in which the outlet or drop for the cement is located at the central bottom portion of the vehicle.

A further purpose of my invention is to provide a bulk cement transporting vehicle in which the payload is materially increased by the absence of mechanical material handling mechanism and the use of space so saved as additional carrying area.

An important object of my invention is to provide a material container and unloading device which may readily be adapted to and installed on the truck or vehicle chassis of the several different types now in manufacture and use.

A further object is to provide a material unloading system which may be operated either with the exhaust gases and pressure built up in the engine exhaust system or by compressed air derived from other sources.

An important advantage of my air unloading bulk material transporting vehicle is that means are provided for the purpose of coupling on and connecting one or more additional vehicles to the pneumatic system of the preceding vehicle.

An important advantage of my air unloading system is that it may be adapted to and installed on various types of granular material transporting vehicles with a minimum of structural changes and alterations.

A further object of my invention is to provide a granular material transporting vehicle in which the unloading mechanism is simple and easy to operate and economical in time required for load discharge.

Additional objects and advantages will be apparent from the following description considered in conjunction with the accompanying sheets of drawings or from both as supplements of each other, wherein are set forth certain novel features of construction, combination and arrangement of parts and functions.

In the accompanying sheets of drawings forming a part of these specifications, and in which like numerals are employed to designate like parts:

Figure 1 is a plan view of a vehicle embodying my invention.

Figure 2 is a side elevation of the same including a fragmentary sectional view.

Figure 3 is an enlarged partial section on line 3—3 illustrating the point of application of the air currents to the toe of the banks of cement.

Figure 4 is an end view of the vehicle showing the interior of the plenum chamber with the rear cover removed.

Figure 5 is a cross section showing the central discharge hopper along the line 5—5.

Figure 6 is a fragmentary plan view of the top surface of the plenum chamber showing the air current and pressure control fabric retaining strips and air inlet perforations.

Referring now in detail to Figures 1, 2, 3, 4 5, and 6 wherein for purposes of illustration are shown preferred embodiments of my invention, the numeral 7 indicates a vehicle chassis on which is mounted a material holding body 8 to which are attached manholes 9 provided with removeable covers 10.

Since the air plenum chambers, 11 in the front and 12 in the rear sections of body 8, are substantially the same in construction this description of chamber 12 will be found typical of both.

To the Z frame 13 of the chassis 7 are secured frame extensions 14 and to Z frame 13 and frame extensions 14 are secured the angle rack supports 15 to which is releasably secured the plenum chamber top plate 16 provided with a flange 17 at its rear section. Top plate 16 is provided with numerous perforations 18 through which the air flows under pressure to and through the air control fabric 19 releasably secured to the top side of plate 16 by means of retainer strips 20 and screws 21 threaded into plenum chamber spacers 22 and bottom plate 23.

To Z frame 13 is attached the plenum chamber bottom plate 23 provided with a flange 24 at its rear section. Numeral 25 indicates side spacer plates welded to body 8 which with flanges 17 and 24 form a flush surfaced frame against which machine screws 26 releasably fasten cover plate 27 provided with an air tight gasket 28.

At its inner end plenum chamber bottom plate 23 is welded to angle cross frame member 29 and at each side to a bottom web of Z frame 13. Between the top web of cross frame member 29 and the front or inner end of plenum chamber top plate 16 is secured a rolled-over portion of the air control fabric 19 by means of screws 30 threaded into top plate 16.

An angularly shaped cross frame member 31 is attached to the webs of Z frame 13 and the front under side of bottom plate 23 by bolts 32 forming a mounting surface to which the back wall 33 of the central discharge hopper 34 is secured. The front wall 35 of the central discharge hopper 34 is secured in a similar manner to the under side of the inner end of the bottom plate of front plenum chamber 11. Angularly inclined sides 36 and 37 of the central discharge hopper 34 are welded to the bottom webs of Z frame 13 and the back wall 33 and front wall 35 of the discharge hopper 34. The lower portions of sides 36 and 37 are formed with vertically disposed sections 38 and 39 to accommodate the balanced discharge hopper gate 40.

The balanced discharge hopper gate 40 is welded to shaft 41 turning in journals 42 and 43 and is closed or opened by means of gear 44 and hand wheel 45. At suitable locations on the inner surfaces of the back and front walls 33 and 35 of the central discharge hopper 34 are welded small plates 46 and 47 acting as stops to limit the movement of balanced discharge hopper gate 40.

At the bottom edge of discharge hopper 34 is attached hinged cover plate 48 which is provided with a locking means 49 so that when closed it forms a shield which prevents the entrance of splashed water or pebbles into the central discharge hopper 34 while in motion and also retains the cement escaping around the closed balanced discharge hopper gate 40.

Extending along the side of body 8 is a compressed air supply pipe manifold 50 to the front of which is secured an elbow 51 provided with a releasably inserted flexible conduit 52 attached at its other end to the exhaust pipe 53 of the vehicle engine or other source of compressed air.

Connected to pipe manifold 50 is an air inlet 54 for the front plenum chamber 11 and an air inlet 55 for the rear plenum chamber 12. A pipe stub 56 having a control valve 57 is connected to pipe manifold 50 for use in coupling on additional vehicles.

Supported on the multi-passaged air current and pressure control fabric 19 secured to the top surface of plate 16 is shown a bank of cement 58 resting at its angle of repose.

In the utilization of my bulk material transporting vehicle cement or other desired granular products are loaded by the usual method through the manholes after first closing and locking the balanced discharge hopper gate 40 and cover plate 48. When the vehicle arrives at the point of destination the first operations consist of opening the cover plate and then turning the balanced discharge hopper gate by means of hand wheel 45 to the opened position. The entrained cement which had been supported by the balanced discharge hopper gate in the closed position now falls out of the open central discharge hopper 34 until the portions of the cement which are supported by the top surfaces of the plenum chambers cease to slide off into the central discharge hopper and the slopes of the banks of cement each reach the angle of repose along a transverse frontal plane. At this time or slightly previously, the flexible conduit from the engine exhaust pipe 53 is connected to the inlet elbow 51 of the compressed air supply pipe manifold 50. As the truck operator builds up the pressure in the plenum chambers by running the engine the compressed exhaust gases escape through the interstices of the air current and pressure control fabric 19 only along the base or toe of the banks of cement. The air currents flowing through the air control fabric immediately move small amounts of cement away from the toe of the cement bank and continues to blow the loose granular particles into the discharge hopper where they fall and are blown out. The recurrent undermining and disturbing of the angle of repose, replacement by the sliding down of additional amounts of cement and the forced discharge of the loose cement all occurring along a substantially simultaneous line of movement transversely disposed across the width of the material chamber create in effect a continuously backward moving plane of falling cement approaching the rear end of the material chamber and a continuously forward moving plane of air and gravity propelled cement approaching and discharging through the discharge hopper 34 until all the cement has been removed. As the toe of the cement bank recedes from the edge of the discharge hopper the air pressure is increased in order to overcome the larger area of air control fabric interstices, or air passageways, uncovered by the retreat of the cement bank.

When fully empty the balanced discharge hopper gate is turned to the closed position, the hinged cover plate is securely locked in place, and, depending upon the location where another load of material is to be obtained, the manholes are covered or left open for insertion of another load or cement.

It will be understood that while the form of my pneumatic unloading type bulk granular material transporting vehicle herein illustrated and described is to be considered as a preferred embodiment of my invention, I do not limit myself to the precise constructions as disclosed but reserve the right to resort to and substitute various modifications and changes in shape, size and arrangement of parts without departing from the spirit of my invention or the scope of my claim as described and indicated above and in the drawings and the following claim:

Having thus described my invention I claim:

A pneumatic unloading type of bulk granular material transporting vehicle comprising: a motorized vehicle; a tank structure mounted on said motorized vehicle; a material intake manhole attached to said tank structure; an angularly inclined floor secured at the rear section of said tank structure; an angularly inclined floor secured at the front section of said tank structure; a discharge hopper secured intermediately of and connecting to said front and rear sectional floors; air pressure chambers located beneath said front and rear sectional floors; passageways formed in said front and rear sectional floors and connecting to said air pressure chambers; compressed air manifolds secured to said air pressure chambers; removable covers releasably attached to said compressed air manifolds; a compressed air pipe manifold extending from the front to the rear of tank structure; intake pipes connecting said compressed air pipe manifold to said compressed air manifold; a pipe elbow connected to said compressed air pipe manifold; a flexible conduit securely attached to the exhaust pipe of said motorized vehicle and adapted for insertion in said pipe elbow connected to said compressed air manifold; all cooperating and co-acting to discharge under applied air pressure an air stream containing and carrying said bulk granular material through said discharge hopper.

THEODORE WILLIAM CLINE.

REFERENCES CITED

The following references are of record in the file of this patent:

UNITED STATES PATENTS

| Number | Name | Date |
| --- | --- | --- |
| 1,971,852 | Goebels | Aug. 28, 1934 |
| 1,971,853 | Ihlefeldt | Aug. 28, 1934 |
| 2,190,727 | McKenna | Feb. 20, 1940 |
| 2,219,283 | Horni | Oct. 29, 1940 |
| 2,471,280 | Norbom | May 24, 1949 |

FOREIGN PATENTS

| Number | Country | Date |
| --- | --- | --- |
| 604,049 | Germany | Oct. 13, 1934 |
| 808,124 | France | Nov. 6, 1936 |